(12) United States Patent
Frey

(10) Patent No.: US 10,492,654 B2
(45) Date of Patent: Dec. 3, 2019

(54) CONTROL OF CLEANING ROBOTS

(71) Applicant: Siemens Schweiz AG, Zurich (CH)

(72) Inventor: Christian Frey, Unteraegeri (CH)

(73) Assignee: SIEMENS SCHWEIZ AG, Zurich (CH)

( * ) Notice: Subject to any disclaimer, the term of this patent is extended or adjusted under 35 U.S.C. 154(b) by 45 days.

(21) Appl. No.: 15/334,428

(22) Filed: Oct. 26, 2016

(65) Prior Publication Data

US 2017/0112345 A1     Apr. 27, 2017

(30) Foreign Application Priority Data

Oct. 26, 2015  (DE) ........................ 10 2015 220 840

(51) Int. Cl.
| | | |
|---|---|---|
| *A47L 11/40* | (2006.01) | |
| *G01C 21/20* | (2006.01) | |
| *G05B 19/042* | (2006.01) | |
| *G05D 1/02* | (2006.01) | |

(Continued)

(52) U.S. Cl.
CPC ......... *A47L 11/4011* (2013.01); *A47L 9/2852* (2013.01); *A47L 9/2857* (2013.01); *A47L 9/2894* (2013.01); *G01C 21/206* (2013.01); *G05B 15/02* (2013.01); *G05B 19/042* (2013.01); *G05D 1/028* (2013.01); *G05D 1/0276* (2013.01); *A47L 2201/04* (2013.01); *A47L 2201/06* (2013.01); *G05B 2219/2642* (2013.01);

(Continued)

(58) Field of Classification Search
None
See application file for complete search history.

(56) References Cited

U.S. PATENT DOCUMENTS

| | | | |
|---|---|---|---|
| 9,298,183 B2 | 3/2016 | Artés et al. | |
| 2006/0048800 A1* | 3/2006 | Rast ........................ | A47L 1/02 |
| | | | 134/56 R |
| 2010/0299016 A1 | 11/2010 | Benzler et al. ................. | 701/26 |

(Continued)

FOREIGN PATENT DOCUMENTS

| | | | | |
|---|---|---|---|---|
| DE | 102007053311 A1 | 12/2008 | ............... | G05D 1/02 |
| DE | 102010006531 A1 | 8/2011 | ............... | B08B 3/00 |

(Continued)

OTHER PUBLICATIONS

German Office Action, Application No. 102015220840.0, 7 pages, dated Jun. 21, 2016.

*Primary Examiner* — Todd M Melton
*Assistant Examiner* — Jason R Roberson
(74) *Attorney, Agent, or Firm* — Slayden Grubert Beard PLLC

(57) ABSTRACT

A method and corresponding arrangement are provided for controlling a mobile cleaning robot for cleaning of a building. A cleaning program with cleaning tasks is loaded into a control unit of the cleaning robot, the current position of the cleaning robot in the building is determined, the respective cleaning tasks are carried out taking into account the current position of the cleaning robot, and based on the current position of the cleaning robot and the cleaning task to be performed at the respective position, at the request of the control unit a building management system activates facilities located at the respective position, so that a corresponding cleaning task is able to be carried out for the cleaning robot.

4 Claims, 2 Drawing Sheets

(51) Int. Cl.
*A47L 9/28* (2006.01)
*G05B 15/02* (2006.01)
(52) U.S. Cl.
CPC .............. *G05B 2219/45098* (2013.01); *G05D 2201/0203* (2013.01)

(56) References Cited

U.S. PATENT DOCUMENTS

| | | | | |
|---|---|---|---|---|
| 2012/0041593 | A1* | 2/2012 | Ichinose | B66B 1/2458 700/258 |
| 2012/0158915 | A1* | 6/2012 | Ham | A47L 9/2857 709/219 |
| 2014/0022074 | A1* | 1/2014 | Balinski | G06F 19/327 340/539.13 |
| 2015/0170509 | A1* | 6/2015 | Artes | G05D 1/0274 340/501 |

FOREIGN PATENT DOCUMENTS

| | | | | |
|---|---|---|---|---|
| DE | 102010037100 A1 | 2/2012 | ............... | A47L 9/28 |
| DE | 102011050357 A1 | 2/2012 | ............... | A47L 9/00 |
| DE | 102012211071 B3 | 11/2013 | ............. | G08B 13/00 |
| DE | 102012109004 A1 | 3/2014 | ............... | A47L 9/28 |
| DE | 202013004080 U1 | 8/2014 | ............... | B08B 3/00 |

* cited by examiner

CONTROL OF CLEANING ROBOTS

CROSS-REFERENCE TO RELATED APPLICATIONS

This application claims priority to DE Application No. 10 2015 220 840.0 filed Oct. 26, 2015, the contents of which are hereby incorporated by reference in their entirety.

TECHNICAL FIELD

The invention relates to a method and to a robot controller for controlling a mobile cleaning robot for cleaning a building. The invention further relates to a cleaning robot and to an arrangement for controlling a cleaning robot. The invention further relates to a computer program and to a computer-readable medium having commands able to be executed on a computer, for controlling a mobile cleaning robot.

BACKGROUND

The use of cleaning robots in private buildings, but also in commercial buildings, has been known for some years. The scope of commercial building cleaning basically covers all internal surfaces of buildings (rooms, corridors, stairwells, etc.). Building cleaning is often carried out in collaboration with third-party contractors. The cleaning plans are created in accordance with the specific usage, meaning that the cleaning plans for office rooms differ from those for seminar rooms or also for secure areas, such as computer centers or laboratories for example. Cleaning robots are intended more and more to replace this activity associated with high personnel costs. These cleaning robots possess sensors, with which they orient themselves in the building and can avoid obstacles. Some cleaning robots already possess artificial intelligence and can be controlled and monitored via remote supervision. However the cleaning activities of such cleaning robots are often not efficient and not adapted to existing situations, especially in relation to the actual usage of premises.

SUMMARY

One embodiment provides a method for control of a mobile cleaning robot for cleaning of a building, said method comprising the following steps: loading a cleaning program with cleaning tasks into a control unit of the cleaning robot; determining the current position of the cleaning robot in the building; carrying out the respective cleaning tasks, taking account of the current position of the cleaning robot, wherein, based on the current position of the cleaning robot and the cleaning task to be performed at the respective position, at the request of the control unit a building management system activates facilities located at the respective position, so that the corresponding cleaning task is able to be carried out for the cleaning robot.

In one embodiment, the current position of the cleaning robot in the building is determined by a positioning system installed in the building.

In one embodiment, based on a building plan present in the building management system, the facilities located at the respective position of the cleaning robot are activated.

In one embodiment, the control unit of the cleaning robot receives weather information via suitable communication means and the cleaning intensity of the cleaning robot is adapted accordingly based on the weather information.

In one embodiment, the control unit of the cleaning robot receives information about previous and/or current and/or future usage of specific areas in the building via suitable communication means and the cleaning intensity of the cleaning robot is adapted accordingly, based on this usage information.

Another embodiment provides a computer program for control of a mobile cleaning robot with instructions for carrying out the disclosed method.

Another embodiment provides a computer-readable medium having commands that can be executed on a computer for control of a mobile cleaning robot with instructions for carrying out the disclosed method.

Another embodiment provides a robot controller for a cleaning robot for cleaning of a building, said robot controller comprising: a first communication unit for communication with a system for positioning in buildings for receiving current position data of the cleaning robot; a second communication unit for communication with a building management system of the building to be cleaned, wherein the current position of the cleaning robot is transmitted cyclically to the building management system; a processor unit for processing a cleaning program with cleaning tasks that can be loaded into the robot controller, wherein the respective cleaning tasks are processed taking into account the current position of the cleaning robot and wherein, based on the current position of the cleaning robot and the cleaning task to be performed at the respective position, at the request of the robot controller the building management system activates facilities located at the respective position, so that the corresponding cleaning task is able to be carried out for the cleaning robot.

Another embodiment provides a cleaning robot for cleaning of a building, said cleaning robot comprising: a first communication unit for communication with a system for positioning in buildings for receiving current position data of the cleaning robot; a second communication unit for communication with a building management system of the building to be cleaned, wherein the current position of the cleaning robot is transmitted cyclically to the building management system; and a robot controller for processing a cleaning program with cleaning tasks that can be loaded into the robot controller, wherein the respective cleaning tasks are processed taking into account the current position of the cleaning robot and wherein, based on the current position of the cleaning robot and the cleaning task to be performed at the respective position, at the request of the robot controller the building management system activates facilities located at the respective position, so that the corresponding cleaning task is able to be carried out for the cleaning robot.

Another embodiment provides an arrangement for control of a cleaning robot in a building, said arrangement comprising: a building management system for monitoring and control of facilities in the building, wherein the building management system manages a building plan for the building; a positioning system for determining the position of mobile objects located in the building; a cleaning robot for cleaning the building, wherein the cleaning robot comprises: a first communication unit for communication with the positioning system for receiving current position data of the cleaning robot; a second communication unit for communication with the building management system of the building to be cleaned, wherein the current position of the cleaning robot is transmitted cyclically to the building management system; and a robot controller for processing a cleaning program with cleaning tasks that can be loaded into the robot controller, wherein the respective cleaning tasks are processed taking into account the current position of the cleaning robot and wherein, based on the current position of the cleaning robot and the cleaning task to be performed at the respective position, at the request of the robot controller the building management system activates facilities located at the respective position, so that the corresponding cleaning task is able to be carried out for the cleaning robot.

BRIEF DESCRIPTION OF THE DRAWINGS

Example aspects and embodiments of the invention are explained below with reference to the figures, in which.

DETAILED DESCRIPTION

Figure 1:
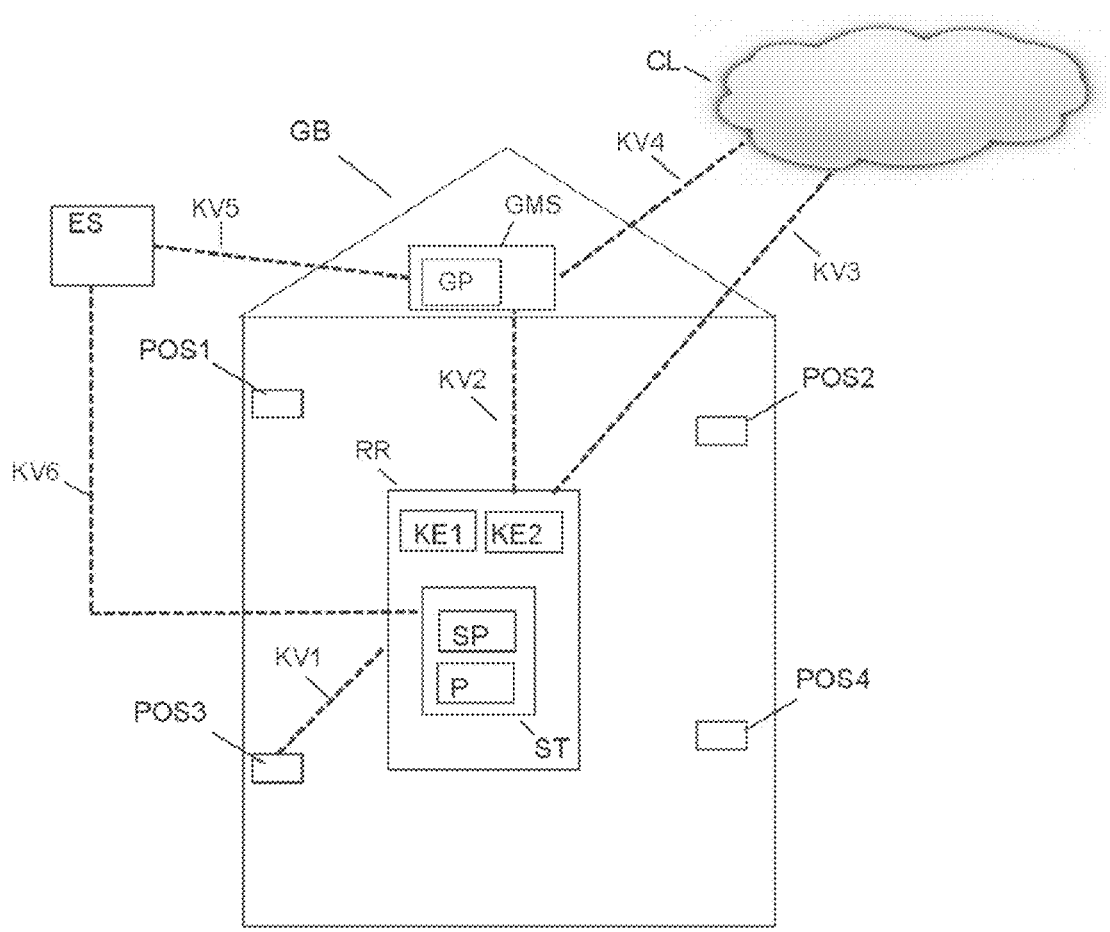
FIG. 1 shows an example of an arrangement for control of a cleaning robot in a building.

Embodiments of the present invention provide a controller or a method of control for a cleaning robot, which makes possible an efficient and adaptive cleaning of premises.

Some embodiments provide a method for control of a mobile cleaning robot for cleaning a building, wherein the method comprises the following steps:

loading a cleaning program with cleaning tasks into a control unit of the cleaning robot;

determining the current position of the cleaning robot in the building;

performing the respective cleaning tasks, taking into account the current position of the cleaning robot, wherein, based on the current position of the cleaning robot and the cleaning task to be performed at the respective position, at the request of the control unit a building management system activates facilities located at the respective position, so that a corresponding cleaning task is able to be carried out for the cleaning robot. The link to the building management system and the precise determination of the position of the cleaning robot makes it possible to exchange information with other facilities, such as the building access control system and the security center for example, which enhances the efficiency of the cleaning and the security for the building as a whole. The use of the cleaning robots also becomes more efficient, in that the cleaning intensity, based on data provided by the building management system (e.g. room occupancy, room usage, weather data) is able to be adapted via facilities and/or weather conditions (adaptive cleaning). Furthermore documentation of the cleaning activity, as well as preventive maintenance or service of the cleaning robot directly from the building management system is possible.

In one embodiment, the current position of the cleaning robot in the building is determined by a system installed in the building for position determination (Indoor Positioning System, IPS). Indoor positioning systems are already in widespread use nowadays or are easy to install in a building, e.g. Pseudolit-GPS, WLAN networks or Bluetooth beacons. Positioning can be carried out within WLAN networks for example by trilateration or by fingerprinting. The inventive method for control of a robot can thus be realized by an infrastructure already present in the building in any event.

In one embodiment, the facilities located at the respective position of the cleaning robot are activated on the basis of a building plan already to be found in the building management system. Thus the cleaning robot can notify its position detected via an indoor positioning system (IPS) (e.g. iBeacons) permanently to the building management system (GMS). If a building plan is stored in the building management system (e.g. from BIM, "Building Information Model", e.g. based on IFC, "Industry Foundation Classes"), the building management system knows where the robot is located. The Building Information Model of the corresponding building is stored for example in a memory (e.g. flash memory) of the building automation system (building management system) or is stored in a database to which the building management system has access.

In one embodiment, the control unit of the cleaning robot receives weather information via suitable communication means and the cleaning intensity of the cleaning robot is adapted accordingly, based on the weather information. The weather information can be transferred from the building management system and/or from an external location (e.g. weather forecast provider) via suitable communication means (e.g. Internet, wireless) to the cleaning robot. The cleaning robot can then, based on this data, autonomously use the respective cleaning intensity required. Thus an adaptive cleaning is possible, based on the current weather. Advantageously the adaptive cleaning is also done based on the current state of the facility to be cleaned in each case (e.g. number of persons attending after a meeting in a conference room or after events with a greater number of people).

In one embodiment, the control unit of the cleaning robot receives information via suitable communication means about previous and/or current and/or future usage (e.g. occupancies) of specific areas in the building and the cleaning intensity of the cleaning robot is adapted accordingly based on this usage information (e.g. occupancy planning). Effective and adaptive cleaning tailored to the respective requirements is thus possible. This is sustainable, saves time and resources.

Other embodiments provide a computer program for control of a mobile cleaning robot with instructions for carrying out the inventive method. The computer program can be loaded into the memory of the controller of the cleaning robot, by a wired or wireless transmission of data. Advantageously the data is transmitted wirelessly by a download of the program from the Internet or from a control center, e.g. a building control center or a service center.

Other embodiments provide a computer-readable medium (e.g. SD card, CD, USB memory stick), having commands that can be executed on a computer for carrying out the inventive method.

Other embodiments provide a robot controller for a cleaning robot for cleaning a building, said robot controller comprising:

a first communication unit for communication with a system for position determination in buildings (Indoor Positioning System, IPS) for receiving current position data of the cleaning robot;

a second communication unit for communication with a building management system of the building to be cleaned, wherein the current position of the cleaning robot is transmitted cyclically to the building management system (or at defined intervals);

a processor unit for processing a cleaning program with cleaning tasks that can be loaded into the robot controller, wherein the respective cleaning tasks are processed, taking into account the current position of the cleaning robot and wherein, based on the current position of the cleaning robot and the cleaning task to be performed at the respective position, at the request of the robot controller the building management system activates the facilities located at the respective position, so that the corresponding cleaning task is able to be carried out for the cleaning robot.

Other embodiments provide a cleaning robot for cleaning a building, said cleaning robot comprising:

- a first communication unit for communication with a system for position determination in buildings (Indoor Positioning System, IPS) for receiving current position data of the cleaning robot;
- a second communication unit for communication with a building management system of the building to be cleaned, wherein the current position of the cleaning robot is transmitted cyclically to the building management system;
- a robot controller for processing a cleaning program with cleaning tasks that can be loaded into the robot controller, wherein the respective cleaning tasks are processed, taking into account the current position of the cleaning robot and wherein, based on the current position of the cleaning robot and the cleaning task to be performed at the respective position, at the request of the robot controller the building management system activates the facilities located at the respective position, so that the corresponding cleaning task is able to be carried out for the cleaning robot.

The disclosed robot controller or cleaning robot may make cleaning adequately adapted to the respective requirements possible. In some embodiments, the disclosed robot controller and/or cleaning robot can be realized by commercially-available components (commercials off the shelf).

Other embodiments provide an arrangement for control of a cleaning robot in a building, said arrangement comprising:

- a building management system for monitoring and control of facilities in the building, wherein the building management system manages a building plan for the building;
- a positioning system determining the position of mobile objects located in the building;
- a cleaning robot for cleaning the building, wherein the cleaning robot comprises:
  - a first communication unit for communication with the positioning system (Indoor Positioning System, IPS) for receiving current position data of the cleaning robot;
  - a second communication unit for communication with the building management system of the building to be cleaned, wherein the current position of the cleaning robot is permanently transmitted to the building management system;
  - a robot controller for processing a cleaning program with cleaning tasks that can be loaded into the robot controller, wherein the respective cleaning tasks are processed, taking into account the current position of the cleaning robot and wherein, based on the current position of the cleaning robot and the cleaning task to be performed at the respective position, at the request of the robot controller the building management system activates the facilities located at the respective position, so that the corresponding cleaning task is able to be carried out for the cleaning robot. The components of the arrangement are usually already present in a building or can easily be retrofitted, such as e.g. the indoor positioning system.

Currently commercial building cleaning is a personnel-intensive activity in the majority of cases, in which (specialist) cleaners from third-party companies regularly handle the cleaning tasks as a gang in the building, frequently after the end of the working day. In addition to high personnel costs, this leads to security risks, since the building owner or even the tenant does not know the cleaners and, unlike visitors, they do not have to sign in or be accompanied by company employees. For entry to secure areas, such as laboratories for example, access must additionally be granted to the cleaner, which increases the risk of espionage or theft. As an alternative the cleaners can be accompanied by security personnel, which further increases personnel costs however.

Currently, despite internal sensor systems, cleaning robots move more or less autonomously and are also not capable for example of opening doors via the building access control system or of moving in the building with the elevator. Also a cleaning robot does not know about the actual usage (volume of personnel) of the surface to be cleaned. Nor does the robot know the weather conditions obtaining (rain, snow) when the building is in use and can thus not take these conditions into account when carrying out a cleaning task.

By linking cleaning robots to a building management system (GMS) or building automation system additional information can be shared with the cleaning robot and thus the performance and the cleaning result can be improved, while at the same time minimizing the security risk.

Nowadays building management systems are an important element of an automated and electronically controlled and monitored facility management. Thus functional sequences in a building can be planned and carried out across facilities. Modern building management systems integrate building-related functionalities such as access control, energy management, comfort management (e.g. heating/cooling), resource management (water, waste, etc.).

Thus the robot can permanently notify its position to the building management system via an indoor positioning system (IPS) with iBeacons for example. If a building plan is stored in the building management system (e.g. from a Building Information Model (BIM)), the building management system can determine very easily where the robot is located. If for example a conference room, the computer center, the laboratory or another sensitive area is now equipped with an access control, the building management system can open the corresponding door for the cleaning robot and can lock it behind it again. Furthermore the robot can also reach a number of floors via the elevator, in that, after completing the cleaning of a floor, the robot navigates to an elevator and the building management system provides the robot with an elevator car via the elevator control and conveys it to the next floor to be cleaned. This increases the action area of a cleaning robot and thus reduces the investment costs.

Furthermore existing intrusion alarms can be partly switched off in parallel via the building management system or their alarm can be suppressed during the time in which the cleaning robot is located within the detection range of the alarm. The building thus remains permanently monitored and undesired alarms are avoided.

The inventive method means that cleaning intervals no longer have to be static, but account can be taken of instantaneous and/or seasonal environmental or weather conditions and optionally also of the actual room usage or room occupancy.

Here the building management system can derive sensor information from the actual room occupancy e.g. from movement sensors, access data, presence sensors, login data (from IT) etc. and optimize the daily cleaning planning accordingly. Furthermore the building management system can derive the prevailing weather conditions from the weather data and thus e.g. increase the cleaning intensity individually, especially in the access areas of the building. This adaptive cleaning leads to consistent cleaning results and thus to satisfied customers. The sustainability of the cleaning is also increased by sparing use of resources and cleaning agents, which has a positive effect on the environment.

FIG. 1 shows an example of an arrangement for control of a cleaning robot RR in a building GB. The arrangement according to FIG. 1 comprises:

- a building management system GMS for monitoring and control of facilities in building GB, wherein the building management system GMS manages a building plan GP for the building GB;
- a positioning system POS1-POS4 for determining the position of mobile objects present in building GB; and
- one or more cleaning robots RR for cleaning the building GB.

A cleaning robot RR comprises:

- a first communication unit KE1 for communication with the positioning system POS1-POS4 (Indoor Positioning System, IPS) for receiving current position data of the cleaning robot RR;
- a second communication unit KE2 for communication between the cleaning robot RR and the building management system GMS of the building to be cleaned GB, wherein the current position of the cleaning robot RR is transmitted to the building management system GMS cyclically (i.e. at specific intervals); and
- a robot controller ST for processing a cleaning program with cleaning tasks that can be loaded into the robot controller ST, wherein the respective cleaning tasks are processed taking into account the current position of the cleaning robot RR and wherein, based on the current position of the cleaning robot RR and the cleaning task to be performed at the respective position, at the request of the robot controller ST the building management system GMS activates the facilities (e.g. rooms or areas in the building) located at the respective position, so that the corresponding cleaning task is able to be carried out for the cleaning robot RR. Thus for example doors can be opened temporarily, so that the cleaning robot RR can move through rooms locked for security reasons, in order to carry out a cleaning task in these rooms. When the cleaning robot RR has completed the respective cleaning task, it leaves the room, which is then locked again by the building management system GMS.

Advantageously the building plan GP is part of a Building Information Model (BIM). This insures the immediate and up-to-date availability of all building-relevant data.

Indoor positioning systems POS1-POS4 are already in widespread use nowadays or are easily able to be installed or retrofitted in a building GB, e.g. Pseudolit-GPS, WLAN networks or Bluetooth beacons. Positioning within WLAN networks can be realized e.g. by trilateration or by fingerprinting. If the indoor positioning system POS1-POS4 is realized by Apple iBeacons, the communication connection KV1 between the indoor positioning system POS1-POS4 and the first communication unit KE1 of the cleaning robot RR is advantageously realized as a Bluetooth Low Energy (BLE) connection.

The cleaning program or the cleaning instructions can be loaded via suitable communication links KV2 or KV3 from the building management system GMS and/or from a Cloud CL onto the cleaning robot RR, e.g. via suitable wireless connections. Advantageously the building management system GMS is also connected to the Cloud CL via a suitable communication link KV4 (e.g. Internet or wireless). This enables building management systems GMS of a number of buildings to communicate with one another for example.

It is further possible for the building management systems GMS and/or the cleaning robots RR to be linked to an external location ES (e.g. a weather service provider) via suitable communication connections KV5 or KV6 for data communication. This enables up-to-date weather data to be taken into account during building cleaning for example.

The communication units KE1, KE2 can also be integrated into the controller ST itself. The robot controller ST comprises memory means SP (e.g. RAM, flash memory) and suitable processor means P (e.g. microcomputer). This enables cleaning programs and cleaning instructions to be carried out.

Furthermore the cleaning robot RR is equipped with suitable mobility means (e.g. rollers, wheels) and personnel protection systems.

Some embodiments digitize and automate building cleaning by linkage to the building management system GMS and thus increases the efficiency of the cleaning while at the same time reducing the risk of having a third party employee working in the company. In addition the personnel costs are significantly reduced, which leads to a considerable reduction in costs (80% of the cleaning costs are personnel costs).

The linkage to the building management system GMS and the precise positioning of the cleaning robot RR makes it possible to exchange information with other facilities such as the access control system and the security center for example, which increases the efficiency of the cleaning and the security of the entire building GB. This is also especially true for hygiene areas such as clean rooms and for food preparation, where high hygiene standards also make greater demands on the cleaning personnel. But also in rooms with temporary or permanent oxygen reduction (for fire prevention), such as computer centers, stores or libraries for example, the robot can simply "enter" and do its job without environmental conditions suitable for humans having to be established beforehand. The use of the cleaning robots RR is also more efficient, in that the cleaning intensity is adapted (adaptive cleaning) and the action radius of the robot is increased via the elevator control.

Furthermore a documentation of the cleaning activity, as well as the preventive maintenance or the service of the cleaning robot directly from the building management system is possible. The cleaning activities can be documented directly in the system, as can the service activities for the robots.

Figure 2:
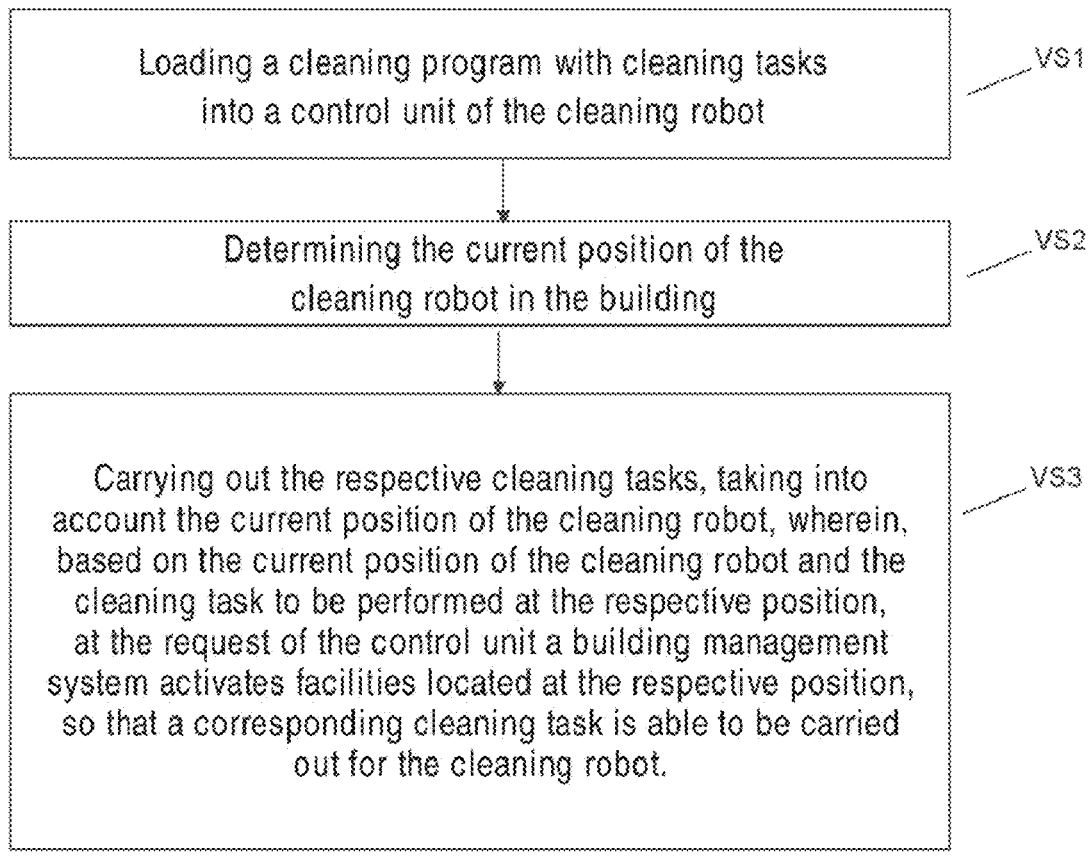
FIG. 2 shows an example of a flow diagram for a method for control of a mobile cleaning robot for cleaning a building.

FIG. 2 shows an example of a flow diagram for a method for control of a mobile cleaning robot for cleaning of a building. The method comprises the following method steps:

(VS1) loading a cleaning program with cleaning tasks into a control unit of the cleaning robot;

(VS2) determining the current position of the cleaning robot in the building; and (VS3) carrying out the respective cleaning tasks, taking into account the current position of the cleaning robot, wherein, based on the current position of the cleaning robot and the cleaning task to be performed at the respective position, at the request of the control unit a building management system activates facilities located at the respective position, so that the corresponding cleaning task is able to be carried out for the cleaning robot.

The method is able to be carried out with the arrangement shown and explained in FIG. 1. The method can thus be carried out with means that are present in any event in facility management or in building management, such as e.g. cleaning robot, building management system, indoor positioning system (e.g. WLAN).

A method and corresponding arrangement for control of a mobile cleaning robot for cleaning of a building, wherein a cleaning program with cleaning tasks is loaded into a control unit of the cleaning robot; wherein the current position of the cleaning robot in the building is determined; wherein the respective cleaning tasks are carried out taking into account the current position of the cleaning robot; wherein, based on the current position of the cleaning robot and the cleaning task to be performed at the respective position, at the request of the control unit a building management system activates facilities located at the respective position, so that a corresponding cleaning task is able to be carried out for the cleaning robot.

REFERENCE CHARACTERS

GB Building
GMS Building management system
GP Building plan
POS1-POS4 Positioning system
RR Cleaning robot
ST Controller
P Processor
SP Memory
KV1-KV6 Communication link
CL Cloud
ES External location
VS1-VS3 Method step

What is claimed is:

1. A method for control of a mobile cleaning robot for cleaning of a building, the method comprising:
   loading a cleaning program with cleaning tasks into a control unit of the cleaning robot;
   monitoring a current position of the cleaning robot in the building;
   sending information to the control unit of the cleaning robot about a current weather condition and at least one of a previous usage, a current usage, or a future usage of the current position via a communication link;
   modifying the cleaning program by adapting at least one of the cleaning intensity or the programmed cleaning tasks of the cleaning robot based on the received information; and
   performing the cleaning tasks based at least on the modified cleaning program;
   wherein, based on the current position of the cleaning robot and a respective cleaning task to be performed at the respective position, at the request of the control unit a building management system activates facilities located at the respective position enabling the cleaning robot to perform the respective cleaning task;
   documenting the cleaning tasks performed by the cleaning robot and recording preventative maintenance of the cleaning robot directly by the building management system;
   wherein monitoring the current position of the cleaning robot in the building includes using a positioning system to determine the current position;
   wherein activating facilities includes the building management system referring to a Building Information Model (BIM) including a building plan; and
   after a floor of the building has been cleaned, providing the robot with an elevator car using the building management system to convey the robot to a further floor to be cleaned or to storage.

2. A control unit for controlling a mobile cleaning robot for cleaning of a building, the control unit comprising:
   a processor;
   a communication link; and
   a cleaning program stored in a non-transitory computer-readable medium, the cleaning program including cleaning tasks and the cleaning program executable by the processor to:
      monitor a current position of the cleaning robot in the building using a positioning system to determine the current position;
      perform the cleaning tasks based at least on the current position of the cleaning robot;
   wherein the control unit receives information about a current weather condition and at least one of a previous usage, a current usage, or a future usage of the current position via the communication link;
   the control unit modifies the cleaning program by adapting at least one of the cleaning intensity or the programmed cleaning tasks of the cleaning robot based on the received information; and
   based on the modified cleaning program, the cleaning program requests a building management system to activate facilities located at the respective position enabling the cleaning robot to perform the respective cleaning task;
   wherein the building management system refers to a Building Information Model (BIM) in the course of activating facilities;
   the building management system directly documents the cleaning tasks performed by the cleaning robot and recording preventative maintenance of the cleaning robot; and
   after a floor of the building has been cleaned, the cleaning program directs the robot to an elevator car provided by the building management system to convey the robot to a further floor to be cleaned or to storage.

3. A cleaning robot for cleaning of a building, the cleaning robot comprising:
   a first communication unit for communication with a system positioned in one or more buildings for receiving current position data of the cleaning robot;
   a second communication unit for communication with a building management system of the building to be cleaned, wherein the current position of the cleaning robot is transmitted cyclically to the building management system;
   a robot controller including a processor for executing a cleaning program loaded into the robot controller, the cleaning program including cleaning tasks,
   wherein the respective cleaning tasks are processed based on the current position of the cleaning robot; and
   the robot controller of the cleaning robot receives information about a current weather condition and at least one of a previous usage, a current usage, or a future usage of the current position via a communication link; and
   the robot controller modifies the cleaning program by adapting at least one of the cleaning intensity or the programmed cleaning tasks of the cleaning robot based on the received information;

wherein, based on the modified cleaning program, at the request of the robot controller the building management system activates facilities located at the respective position to enable the cleaning robot to perform the corresponding cleaning task using a Building Information Model (BIM) including a building plan;

the building management system directly documents the cleaning tasks performed by the cleaning robot and recording preventative maintenance of the cleaning robot; and after a floor of the building has been cleaned, the robot navigates to an elevator based on information provided by the building management system to travel to a further floor to be cleaned or to storage.

4. An arrangement for control of a cleaning robot in a building, said arrangement comprising:

a building management system for monitoring and control of facilities in the building, wherein the building management system manages a building plan for the building including a Building Information Model (BIM);

a positioning system for determining a position of mobile objects located in the building;

a cleaning robot for cleaning the building, wherein the cleaning robot comprises:

a first communication unit for communication with the positioning system for receiving current position data of the cleaning robot;

a second communication unit for communication with the building management system of the building to be cleaned, wherein the current position of the cleaning robot is transmitted cyclically to the building management system;

a robot controller including a processor for executing a cleaning program loaded into the robot controller, the cleaning program including cleaning tasks, wherein the respective cleaning tasks are processed based on the current position of the cleaning robot;

the robot controller of the cleaning robot receives information about a current weather condition and at least one of a previous usage, a current usage, or a future usage of the current position via a communication link; and the robot controller modifies the cleaning program by adapting at least one of the cleaning intensity or the programmed cleaning tasks of the cleaning robot based on the received information;

wherein, based on the modified cleaning program, at the request of the robot controller the building management system activates facilities located at the respective position to enable the cleaning robot to perform the corresponding cleaning task;

the building management system directly documents the cleaning tasks performed by the cleaning robot and recording preventative maintenance of the cleaning robot; and after a floor of the building has been cleaned, the building management system provides an elevator and navigation directions for the robot to enter the elevator to travel to a further floor for cleaning or to storage.

* * * * *